United States Patent
Walters et al.

(10) Patent No.: US 6,914,695 B2
(45) Date of Patent: *Jul. 5, 2005

(54) PROCESS OF OPERATIONS WITH AN INTERCHANGEABLE TRANSMISSION DEVICE AND APPARATUS FOR USE THEREIN FOR A COMMON INTERFACE FOR USE WITH DIGITAL CAMERAS

(75) Inventors: Craig R. Walters, Poughkeepsie, NY (US); Scott M. Blackledge, Wappingers Falls, NY (US); Steven R. Carlough, Wappingers Falls, NY (US); Nathan J. Lee, New City, NY (US); Amy S. Purdy, Poughkeepsie, NY (US); Adrian O. Robinson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 09/924,637

(22) Filed: Aug. 8, 2001

(65) Prior Publication Data

US 2003/0030839 A1 Feb. 13, 2003

(51) Int. Cl.$^7$ ............................................. G06K 15/00
(52) U.S. Cl. ....................... 358/1.15; 358/1.1
(58) Field of Search ................... 358/1.1, 1.13, 358/1.14, 1.15, 1.16, 1.17, 1.18, 824, 400, 403; 709/217–222; 725/81

(56) References Cited

U.S. PATENT DOCUMENTS

| | | | |
|---|---|---|---|
| 2001/0032335 | * | 10/2001 | Jones ........................ 725/105 |
| 2003/0163544 | * | 8/2003 | Wookey et al. ............. 709/217 |

OTHER PUBLICATIONS

"Wireless Protocol is Coming: Are You Ready?", John Gantz, Computerworld News & Features, http://www.computerworld.com/swi/story/0,1199,NAV47_STO44464, 00.html, pp. 1–3.

Technology Overview Bluedrekar, http://www.alphaworks.ibm.com/aw.nsf/techmain/bluedrekar pp. 1–3.

* cited by examiner

*Primary Examiner*—Arthur G. Evans
(74) *Attorney, Agent, or Firm*—Lynn L. Augspurger

(57) ABSTRACT

A digital camera supplies images to a first computer of a network via a receiver which is enabled as a bridge for Bluetooth, wireless LAN and infrared transmission from a digital camera. Once a digital camera is registered in a computer system, transmissions from the camera can be transmitted to the receiving first computer and thereafter transferred over the network for creation of a multi-media file which can be viewed at a private network or Internet accessible second computer.

8 Claims, 8 Drawing Sheets

FIGURE 8

| User ID | | File Information | |
|---|---|---|---|
| 16 Byte User ID | 8 Byte Device ID | 2 Byte Field Size | File Specification |

| Command | | Flag - Unspecified |
|---|---|---|
| 2 Byte Field Size | Command Field | 3 Byte Field for Future Specifications |

| Image Data | | Caption Information | | |
|---|---|---|---|---|
| 4 Byte Field Size | Image Data | 2 Byte Field Size | 1 Byte Flag | Caption Information |

PROCESS OF OPERATIONS WITH AN INTERCHANGEABLE TRANSMISSION DEVICE AND APPARATUS FOR USE THEREIN FOR A COMMON INTERFACE FOR USE WITH DIGITAL CAMERAS

THE FIELD OF THIS INVENTION

The field of this invention is information technology, and particularly this invention relates to a process of operations with an interchangeable transmission device and apparatus for use therein for a common interface for wireless communications particularly useful for use with digital cameras.

TRADEMARKS

IBM is a registered trademarks of International Business Machines Corporation, Armonk, N.Y., U.S.A. Other names may be registered trademarks or product names of International Business Machines Corporation or other companies.

BACKGROUND OF THE INVENTION

While many young engineers today will not remember the "brownie", an early ubiquitous box for taking images on film made by Eastman Kodak and turned into the company for development of the film, there are today disposable cameras available to a customer at a "drug store" which allow the customer to take images on a film inside the cameras. These customers then return the camera to the drugstore for development of the film inside the camera. The purchase of the disposable camera with included film costs in the neighborhood of US$10.00 for say 24 or 36 exposures. Then development and printing onto 3×5 inch photo prints costs a like amount, and as a result today the total cost per print ranges between about 50 cents to 85 cents.

However, in this "modern" era, the digital generation is able to have images printed for something like 36 cents a piece by a photo developer at the mall, by using a digital image camera. The digital photographer can either take in a diskette or a Smart media or Flash card to the store or take in the camera itself if it stores the images on an internal chip to photo print/development houses that have the equipment to print the image.

Today there are many different varieties of processing digital images with a digital camera which has a CCD photo sensor, a controller and some sort of memory for storing the images captured by the digital camera's photo sensor and stored on the internal memory, such as the micro diskette, the Smart media or Flash card. Digital cameras using removable memory such as a micro diskette, 64 megabyte storage device elements such as the Smart media or the Flash card, or "Zip" drives, as a storage device can capture more images than can a more moderately priced digital camera which stores images on an internal chip are commonly used. These digital cameras usually have a port for uploading the images taken and locally stored to a personal computer via the USB port on the PC or laptop computer. Since Microsoft® unveiled its Windows® 95 photo viewing and printing of images uploaded (sometimes called "download", "offload" or otherwise "transferred") to the personal computer viewing and printing system over the USB cable has been available to the many users of Microsoft's imaging software which is included with the operating system installed on most personal computers and laptops. Typically the images are 840×680 pixels in size.

Hewlett Packard® provides equipment for photo printing and a Smart media digital camera (the HP615) which may be purchased for about $1000 as a package, with each 64 Megabyte Smart or Flash card being purchased separately. Larger images are now readily available in digital cameras using JPEG compression. For instance a 3.1 megapixel image having a resolution similar to the resolution of a 35 mm optical camera can now taken with a digital camera purchased at retail for about $500.00.

State of the art digital cameras which may be used with the development that will be described but which do not afford now our improvements may be purchased from retailers of the Sony® Corporation's (via its Sony Electronics, Inc. as well as Sony Semiconductor and Sony Computing operations) products. There are several Sony Digital Cameras. For instance there is the DSC-F1 Digital Still Camera with an infrared wireless connectivity to a PC. As seen at:

http://www.ita.sel.sony.com/products/archive/imaging/dscf1.html)

this DSC-F1 Digital Still Camera is a Sony Digital Still Camera which features infrared wireless connectivity to a PC as well as an internal flash memory capable of storing up to 108 pictures at a 640×480—24-bit color (16.7 million colors) resolution. The DSC-F1's built-in 1.8" LCD screen allows for easy viewing with no need to hold the camera up to your eye with "what you see is exactly what you get" and allowing using the LCD monitor, one to instantly review your pictures in the field and delete any unwanted ones. This DSC-F1 provides a wireless (infrared) connection allowing the user to send images to and from the camera's internal storage (4 MB Internal Flash Memory) and a PC with Windows 95, 98 or 2000 (There are drivers for all Microsoft versions.) You can also print pictures directly to Sony's DPP-M55 Digital Color Photo Printer with wireless infrared support—without the need for a computer. With standard video output, the DSC-F1 can be connected directly to a TV or video monitor, and used as a portable presentation device. The DSC-F1 comes bundled with ArcSoft's PhotoStudio® DSC image manipulation software. The user can artistically modify the pictures taken by distorting, adding effects, tiling, merging, and other techniques. The images taken are provided with a digital date/time stamp. The digital interface for the DSC-F1 is infrared (which connects to Windows 95 PC with IrDA (infra-red digital adapter) support*) and USB Serial (which connects to a Macintosh or a PC via supplied a cable). The video output is provided by an NTSC Standard Phono Jack. The recording modes are single frame (normal) or continuous, timed, multi-screen, or self-timed. Sony Corporation also supplies a variety of parts for optical and wireless sending of digital information for custom manufactured products (as illustrated by those on their web site for current devices, see the printout thereof provided with this application from the web site http://www.sel.sony.com/semi/number.html) and packages these or similar products as a complete system like the Hewlett Packard 615 package with their own Sony package (see http://www.ita.sel.sony.com/products/archive/imaging/dppm55.html). Other Sony Digital Cameras are in the DSC-D700 Series, where particularly the DSC-D770 at the time of this application was a camera which could be used in the environment of the preferred embodiment of the invention. This DSC-D770, as described at the Sony Web site located at http://www.sel.sony.com/SEL/consumer/ss5/office/digitalstillcamer as/cybershotrtmdigitalstillcameras/dsc-d770_specs.shtml is a Sony Cybershot (trademark claimed by Sony) professional Digital Still Camera: This is a Sony consumer digital still camera with exceptional image quality and features that can only be found on high-end professional cameras. The DSC-D770 features a high performance Progressive Scan 1.5 Million Square Pixel CCD. This will create still images with high quality resolution (up to 1344× 1024), which is excellent quality for printing or sending still images from a user's computer once they are there. 5× Manual Optical Zoom Lens with Manual Focus: Equivalent to a f28 mm to 140 mm zoom lens in a 35 mm camera, this manual zoom lens gives a user flexibility in composing pictures. The manual focus ring allows for a more accurate, so called, professional feel. High Quality Progressive Scan CCD with 1.5 Million Square Pixels Provides high quality still images by reading all of the pixels on the imager (CCD) with a single pass, delivering clean edges and an overall sharper picture quality. 2.5" Advanced Color LCD with Brightness Control (180K Pixels): Use the LCD for playback, or for the viewfinder while taking shots. Large, full color LCD Display viewfinder enables a preview or review of shots right on the camera back with detail and clarity. Removable ATA Type II PC Memory Card or Memory Stick media is the supplied storage medial. A popular storage media, ATA Type II PC memory cards allows storage digital images on these cards. The DSC-D770 will also allow the capture of images on a supplied Sony 8MB Memory Stick Digital Storage Media and ATA Type II PC Card Adapter. The Sony MSAC-PC2 Memory Stick Card Adapter is than twice as fast as the previous MSAC-PC1, so the MSAC-PC2 decreases the read/write time significantly. JPEG or TIFF File Formats: A user may select between JPEG compression, or for best quality, choose the non-compressed TIFF mode to capture images. This Sony Digital Camera provides a variety of automatic and manual modes for capture of images with or without flash and strobe lights, and other features to provide control over an exposure to enhance performance results. This Sony Digital Camera is supplied with a PC Card Reader which allows for easy parallel port connection to a IBM PC compatible computer. The Camera is also supplied with an 8 MB Memory Stick Digital Data Storage (MSA-8A), a Memory Stick PC Card Adapter (MSAC-PC2), a Wireless Remote Controller (RM-S7D) enabling infrared remote control, a Video Cable and other accessories including the MSA-8A/16A/32A/64A Memory Stick Media, MSAC-FD2M Memory Stick Floppy Disk Adapter, a MSAC-PC2 Type II PC Card Reader, and a MSAC-US1 Memory Stick USB Adapter are supplied by Sony for use with the Digital Camera.

The Sony DPP-M55 Digital Color Photo Printer provides an infrared connection to a Sony Digital Still Camera and makes the Digital Color Photo Printer a simple solution for printing digital photos. This printer uses dye sublimation printing technology and dye sublimation printing is achieved when standard process dyes are heated to the degree of vaporization in a transfer roll and diffused onto paper to produce continuous—tone images. Unlike color ink jet printing technologies where a liquid is transferred straight to paper, the dye sublimation process converts liquid to gas producing rich, continuous—tone colors. The infrared wireless connection on the DPP-M55 lets you print pictures directly from Sony's DSC-F1 Digital Still Camera (without any computer necessary). This wireless connection also doubles as an infrared adapter to connect Sony's DSC-F1 Digital Still Camera to the computer.

Furthermore, as IBM Japan's Research Published in January 2001, at a web site an overview of the Bluetooth technology today. As they said, recently, many types of mobile devices with high-level computing capabilities, such as cellular phones, Cps, digital cameras, and high-performance PDAs, have come into widespread use. In 2000, some of these devices became capable of short range wireless communication empowered by the Bluetooth TM technology. IBM Japan's research area is the computing environments in which such mobile devices are organically connected each other. IBM Japan's web page introduced the Bluetooth technology and ad-hoc networking as an example of their projects.

As they said with respect to the Bluetooth technology, some time ago, each of peripheral devices, such as mice, keyboards, and printers, used to require a dedicated cable to be connected to a PC. Now, thanks to the Universal Serial Bus (USB), they only need a standard cable. For instance, with IBM's Net Vista X40 line, a keyboard and a mouse use radio frequency signals to communicate with the CPU And the keyboard and mouse can be purchased separately and added to most USB equipped machines. In near future, the Bluetooth technology will throw all the cables out of our computing environments. What is Bluetooth? It is a short range wireless communication technology developed by leading computer and communication companies in the world. IBM is one of the five founding companies. The name Bluetooth comes from the king of Denmark, who controlled Denmark and Norway in the 10th century. We expect that the Bluetooth technology will unite the worlds of cellular phones and data communications as the king did in Scandinavia.

The Bluetooth technology connects nearby devices at a data rate of 1 Mbps. It automatically searches for devices within its radio range (10 m) and connects them. The Bluetooth technology allows one to get rid of the troublesome operations needed to find a connector at the back of the PC to plug a cable in it. Over two thousand companies have adopted the Bluetooth technology for such ease of use.

If one has been to an exhibition on electronics or computers in the last year, there were some Bluetooth devices on display at the exhibition. Cannon of Japan has displayed digital cameras at such exhibitions, for those that can remember Dick Tracy, IBM demonstrated a watch shaped computer with the Bluetooth technology at San Jose Bluetooth Developers's Conference in December 2000.

Some companies including IBM were already shipping Bluetooth products by the end of 2000. Many if not all digital devices such as cellular phones, PDAs, and game machines will be ready to communicate each other with the Bluetooth technology sometime in 2001.

Use of Ad-Hoc Networking makes use of the large scale of infrastructures which are behind the network being used now, such as servers, routers, gateways, phone lines. When we want to use a network in a meeting, we have to hold the meeting in a room with those facilities and might even pay for that. As it would be more convenient, we believe it would be desirable for a network to be used if it could autonomously be generated at the time desired for a meeting. Today it has not been possible to autonomously construct a network at any place, any time, and with anybody by means of the Bluetooth technology, or other wireless technology.

The Bluetooth technology can be used to connect devices each other easily. However, just a connection does not mean construction of a network. We need a mechanism that manages the network as the infrastructure of a conventional network does. Furthermore, the Bluetooth wireless communication normally can reach no more than 10 meters, and supports only eight active devices in a cell. It is noted that the current Bluetooth specification supports an option of a 20 dbm version as well which will give a 100 meter range. Nevertheless, the range is a problem, and in order to overcome these limitations, in January 2001 IBM Japan researchers reported that they were going to deploy a multi-hop network, in which information is relayed by intermediate devices from the source to the destination. They hoped to created a mechanism for the devices to construct a network autonomously and to forward packets toward the destinations.

As an aside, but to complete the IBM Japan research story found at http://www.trl.ibm.com/projects/wireless/index_e.htm, the web pointed to efforts underway in Japan to create a new way of communication, completely different from conventional networks, named GinJo (Geographical Interactive Network for Jumping Objects). Unlike usual networks, where packets are addressed to particular devices, the destination of the information in GinJo are specified by attributes of the devices, such as locations, time, and users' preferences. The Japanese reported efforts envisioned implementing GinJo on top of the Bluetooth wireless technology.

But Bluetooth technology, like other current wireless communication protocols, requires support from varying amounts of hardware that is specific to one of a variety of communication protocols. Such hardware has some common base, with protocol specific hardware around it. Due to the limited coverage area that each protocol offers and the varying benefits of each protocol, people are currently either restricted to using protocols that limit their devices functionality, but provide a larger coverage area, or they use a more functional protocol at the sacrifice of mobility. Improvement is needed for these developments.

SUMMARY OF THE INVENTION

In creating the process of operations described herein, we have obtained use of a set of interchangeable wireless transmitters that allow users to change their transmissions to obtain the maximum benefit of their coverage area. For example, rather than using a standard cellular protocol to communicate from a wireless camera to a server, an end user of using a device which is operable within our process of operations could remove a cellular transmitter and replace it with a wireless LAN transceiver in order to use the higher bandwidth that a LAN transceiver protocol offers.

Use of our receivers for wireless digital imaging which enables a user to provide a service in a number of general business areas, for example, in the resort industry, in the home/consumer market, in photo journalism, in general sales, in the medical profession, in the emergency response field and in counter intelligence.

These and other improvements are set forth in the following detailed description. For a better understanding of the invention with advantages and features, refer to the description and to the drawings.

DESCRIPTION OF THE DRAWINGS

FIG. 8 provides an example of a data object generated in a digital camera and transferred to the server of FIG. 7 in accordance with our preferred embodiment.

Our detailed description explains the preferred embodiments of our invention, together with advantages and features, by way of example with reference to the drawings.

DETAILED DESCRIPTION OF THE INVENTION

Figure 1:
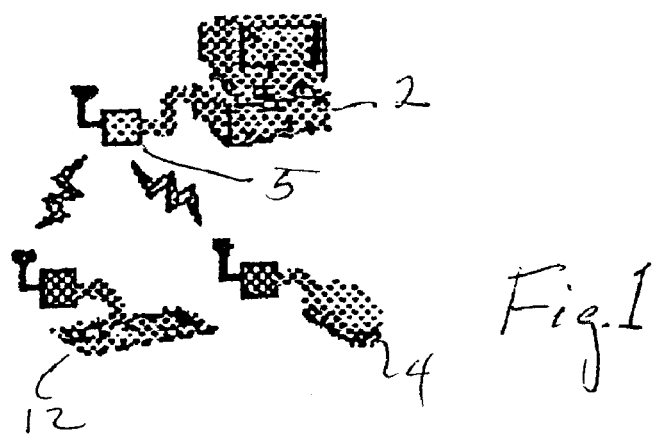
FIG. 1 shows schematically a wireless enabled PC, such as an IBM Net Vista X40 which has a wireless keyboard and mouse.
Figure 2:
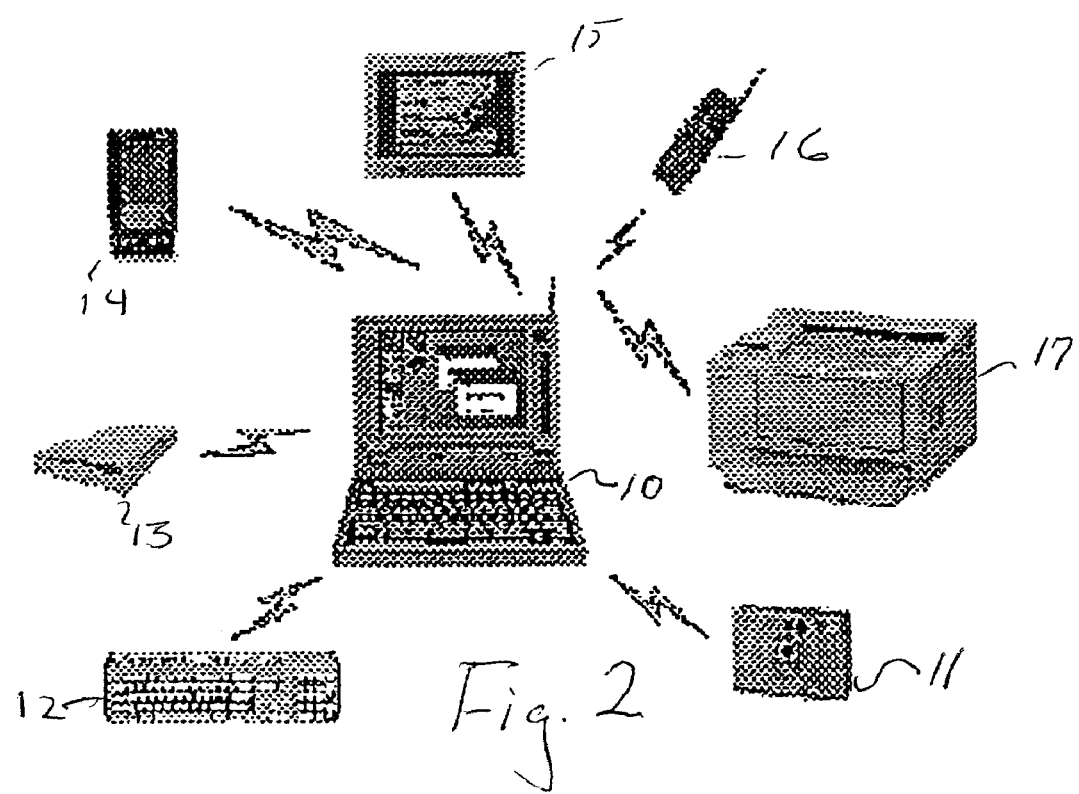
FIG. 2 illustrates the Bluetooth environment for a wired LAN for enabling the preferred embodiment of the invention for worldwide TCP/IP access.
Figure 3:
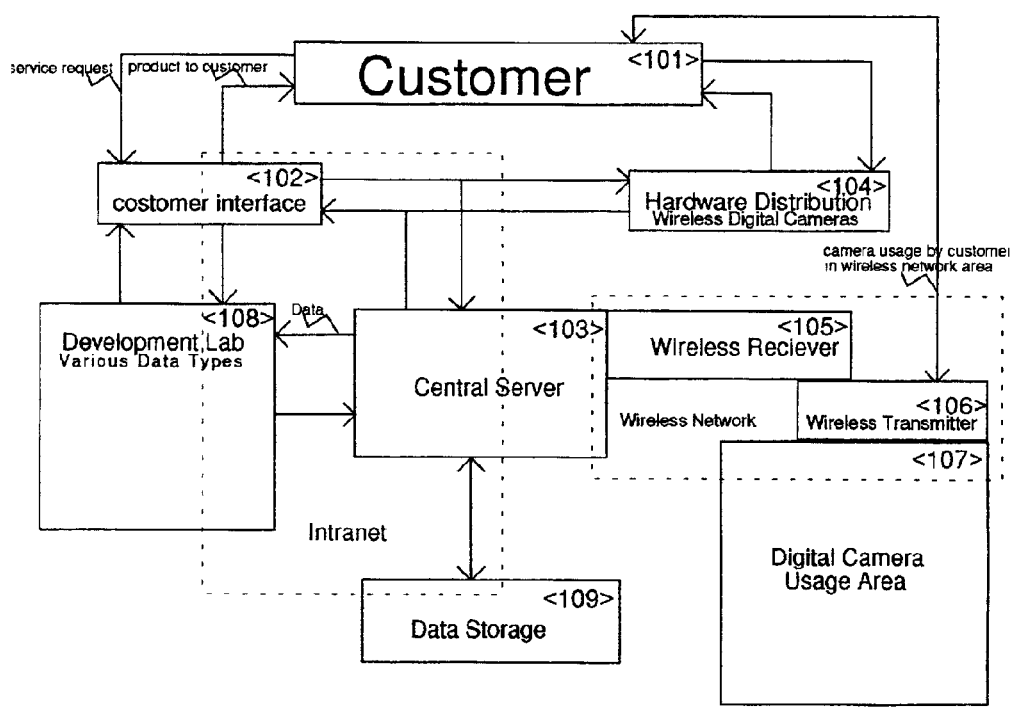
FIG. 3 illustrates the process of operations which a business that provides wireless digital cameras to customers employed in our preferred embodiment.

We note here that Sony sells a Vaio PC and also sells a 11 Mbs Wireless Access Point/Wireless LAN PC Card Bundle for $599.00 which enables the Vaio PC to communicate with the Access Point via a wireless LAN 802.11b support card which is the industry standard for high-speed wireless LAN. FIG. 1 similarly shows schematically a wireless enabled PC 2, such as an IBM Net Vista X40 which has a wireless keyboard 12 and mouse 4 which can serve also as a Wireless Access Point, and like the IBM Thinkpad can be fitted with a USB cable. FIG. 2 illustrates the Bluetooth environment for a wired LAN for enabling the preferred embodiment of the invention for worldwide TCP/IP access. Although Wired LAN (802.11) and Bluetooth share the same ISM frequency band (2.5 GHz), they operate significantly differently and they cannot intercommunicate. The bridge between them can be made and is made within the illustrated IBM Thinkpad 10 by using the IBM Thinkpad bus to link both a 802.11b access point (such as the Sony wireless LAN Access Point) and a Bluetooth Access point within the IBM Thinkpad which is the first computer of the preferred embodiment as IBM's Thinkpad in accordance with a preferred embodiment is modified to provide both 802.11 and Bluetooth as illustrated, together with any other device, such as an infrared IR device used by digital cameras, which can use the first computer's USB port and cable connection to the specific receiver, as illustrated in FIG. 2. This first computer thus becomes an interchangeable transmission device providing a common interface as a receiver for use with various digital cameras 11 and is serviceable in a wireless network, as illustrated by FIG. 3. Also, the IBM Thinkpad 10 being Bluetooth enabled and sell as having the 802.11b access point can communicate with transceivers illustrated by not only the wireless keyboard 12 and mouse 4, illustrated with respect also to FIG. 1 with the USB port, but also a portable mass storage device 13, a palmsized minicomputer 14, a remote visualization display 15, a cellular phone 16 and a scanner printer 17, which via the Thinkpad can also have USB port reception, as illustrated by FIG. 1.

With the process of operations and devices described herein we enable a resort industry to allow user customers to employ a wireless digital camera to record their activities in their tours, cruises and any other resort/tourist related businesses to provide these customers with a method of documenting their experience by recording their experience with the digital camera as one or more files. The customer will use their own or a borrowed or rented wireless digital camera to take photographs of their experience and will be given an album of selected photos at the end of their vacation. This also allows the business to attract potential customers through present customers' memories.

The process of operations and devices described herein is also enabled for use in the home/consumer market where any business allows the consumer who owns or rents or borrows a wireless digital camera to use it enabling the business to provide the consumer with services, such as; a web page for data storage and online photo albums, or development of digital photos into pictures for consumers who want hard copies of their memories.

The process of operations and devices described herein is also enabled for use in the photo journalism business area where opportunities are present for the usage of wireless digital cameras by journalists as a tool to store their photographic work safely as soon as they are captured. Journalists can capture images and upload them to web base articles or upload and store on servers to avoid lost of priceless data in the field.

The process of operations and devices described herein is also enabled for use in the general sales and marketing industry where businesses such as insurance and real estate businesses can use data from wireless digital cameras to speed up the service they provide to their customers. In the insurance industry claims can be processed quicker if a wireless digital camera is used to upload the scene of the an accident directly to the insurance company. In the real estate industry visual representation of properties can be conveyed to potential customers quicker via a wireless digital camera by uploading to the company's web site.

The process of operations and devices described herein is also enabled for use in the medical profession allowing a miniature version of a wireless digital camera to be used for capturing internal images of organs and or foreign agents in the human body and providing them to a physician. This method would be desirable because it can be less harmful and more detailed than a x-ray.

The process of operations and devices described herein is also enabled for use in counter intelligence and emergency response practices which can also use digital cameras to produce documentation or proof with more speed, safety and accuracy of the truth of the moment. For example an officer on the scene of a crime can get photos of victims and or suspects out to their network immediately.

Figure 4:
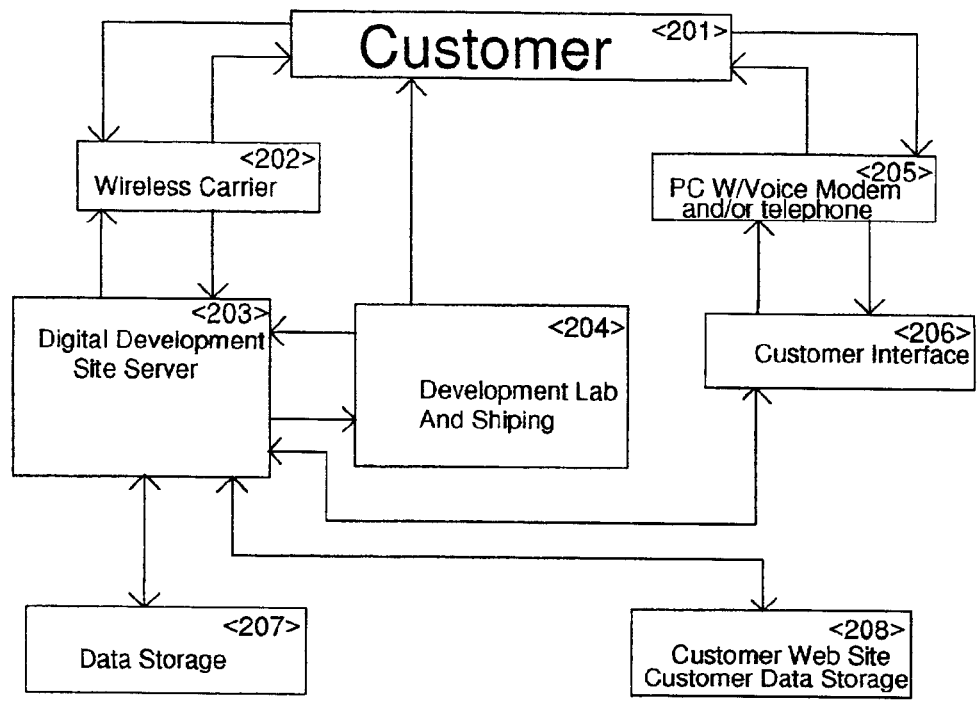
FIG. 4. illustrates the wireless network employed though which digital pictures are transferred in accordance with our preferred embodiment.

The FIGS. 3 and 4 illustrate diagramatically the process of operations with devices which enable the of data for two business models representative of potential business areas, like those described above. Each diagram will be discussed below. These two diagrams can be used to describe possible business applications afforded by our inventions.

FIG. 3 illustrates the process of operations which a business that provides or registers wireless digital cameras for customers usage while enjoying some other service of the service provide to enable visual memories of the customers experience to be enjoyed as a further service for those customers.

As we will describe the model, the reader will imagine one or more of the businesses represented by a resort which we will use as the example. As illustrated by FIG. 3, the customer <101> represents the customer, or in the case of our example, a family on vacation. FIG. 3 shows the customer interface <102> which can be either a human interface or electronic (wed-based or multimedia link) to a kiosk or customers room where a first computer is provided. While shown in FIG. 3 as part of the Intranet, the location, as noted of the customer interface <102> can be within the wireless network and there can be more than one first computers which provide both the customer interface and the point for reception of information from the digital camera usage area <107>. These networks, as illustrated by FIG. 3 are bounded by dotted lines representing the Intranet and the wireless network. The customer interface <102> will set up the customer's account and communicate customer information between the registered camera distribution center illustrated in FIG. 3 as the Hardware Distribution <104> for wireless digital cameras node. FIG. 3 illustrates the location of the Development lab for various data types <108> and the control point central server <103> which is situate in both the intranet and wireless network.

The central server <103> of FIG. 3 controls customer accounts. The central server sets up each account and manage the stored data and data received under each account in data storage <109>. So in our example when a customer takes a picture within the resort representing the wireless network the data goes to the central server. The central server through the registered camera ID which is transferred with the data from the first computer's wireless receiver <105> stores the image under the customers account. The customer can then access their photos on an intranet site or through the customer interface's human interface applicable to the intranet to select preferred photos.

The hardware distribution center for wireless digital cameras <104> is located in a convenient location to the area of usage. Here the customer registers the camera to be used and receives and returns borrowed cameras and from the distribution center which may be at a registration kiosk or in the customer's room information on customer status is sent to the customer interface and to the central server via that customer interface <102> as illustrated in the preferred embodiment.

The customer then proceeds to the usage area FIG. 3 Block <107> in the case of our example the resort. The usage area is covered with a wireless network most likely bluetooth. The network consist of wireless transmitters FIG. 3 Block <106> and receivers FIG. 3 Block <105> that uploads photographic data and camera ID to the server.

After data is sent to the central server it is stored in data storage <109> in the customers account. The customer data along with customer preferences provided through the interface are sent to the development lab <108> where an album or digital album on a CD is developed for the customer. The product can then be picked up at a distribution center or in the case of a resort sent to the customers room. This product can be displayed on the customer interface in the form of a first computer equipped with a media viewer, of the kind supplied with Windows 2000. This model can also be used for advertising by posting photos from the Intranet or from the CD on the Internet or though customer's albums, which they might show to potential customers.

FIG. 4. illustrates the wireless network employed though which digital pictures are transferred in accordance with our preferred embodiment which enables any business that provides a customer who owns or borrows his/her own wireless digital camera with a service to use a wireless image business model. The customer <201> in FIG. 4 might request services such as data storage in the case of a journalist, investigator, insurance agency, Realtor (registered trademark) or consumer. The customer might also request services such as hard copy of pictures if they are not comfortable with digital data or web site host for those who want online albums.

The digital pictures along with camera ID are transferred through a wireless carrier <202> such as the wireless network of FIG. 3 to the Digital development site server <203> corresponding to the central server of FIG. 3. Data is stored under customer account in the data storage unit <207> which performs the function of the storage unit <109> of FIG. 3.

Through the wireless carrier <202> interface or through a PC with voice modem or telephone connection <205> data can be sent to a development lab <204> to create hard copies of the photographs from the data stored in data storage. Data is uploaded to the server where the customer requests the service through the customer interface <206> either through an existing account that is setup to automatically print the pictures or through an online request and data submission. The digital data will then be processed into hard copy photographs and shipped to the customers address from a site designated as the site for development lab and shipping <204>. The customer can also have a setup where their digital pictures are automatically uploaded to their customer web site <208> with customer data storage or stored in data storage space <207> which is rented. This data storage space in a preferred embodiment functions as a portable digital image store which can access a first computer device and which has for the purpose a transceiver for transmitting multi-media data including digital image data via a wireless protocol, including that of either the Bluetooth protocol and wireless LAN protocol, or both.

A provider of services using the described system will recognize that there are also business opportunities in development and distribution of the wireless digital cameras. The cameras can be developed and sold to customers who wants the cameras for business or personal usage.

Figure 5:
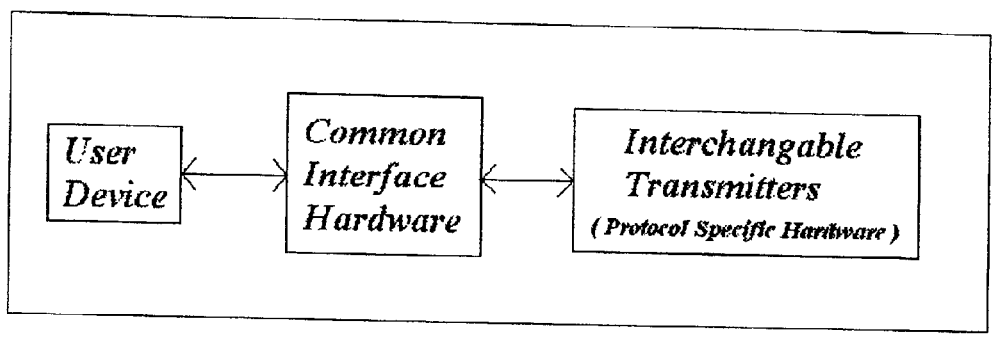
FIG. 5 shows a block diagram of our preferred interchangeable transmitter.

FIG. 5 shows a block diagram of our interchangeable transmitter which may be coupled to the common interface hardware represented by FIG. 2's Bluetooth environment for a wired LAN for enabling the preferred embodiment of the invention for worldwide TCP/IP access. The preferred embodiment of this device is two main functional pieces, which can be easily disconnected and reconnected. The first device represented by the first computer provides common interface hardware for acting as a wireless receiver <105> which communicates within the wireless network with the user and which will allow numerous secondary devices to communicate with the host device via the wireless receiver. These secondary devices will contain the unique hardware necessary for the specific communication protocol and some hardware that will allow it communicate with the common interface.

The protocols initially supported by these interchangeable transmitters representing the wireless transmitter <106> of FIG. 3 are selected from digital protocol groups including: bluetooth, wireless LAN, Infrared (IF) which are the preferred set of features incorporated in the first computer acting as a receiver, but with additions including satellite when the receiver has a satellite modem, RF, and cellular WAP (wireless application protocol) as these known protocols may be adapted for the stated use and are available now in specific enabled PDAs and personal computers as receivers. The first computer can have attached to the other protocol devices by USB port couplings.

Currently, digital cameras and PDAs, and similar wireless devices have a limited memory. Once their internal memory is used up, or the available swappable memory is exhausted, the user is required to access a personal computer to free up the storage space before continuing using these devices. This is done as illustrated by FIG. 3.

By using the process of FIG. 3, the common interface first computer acts as a port for a wireless enabled mass storage device represented by the data storage <207> which may be a portable Bluetooth Data Storage device with transceiver for transmitting to a first computer device of FIG. 4 and the Customer's Data Storage represented by the Customer Web Site Customer Data Storage <208> and one which would allow data to be transferred to a portable hard drive through a wireless connection and the use of the IBM Thinkpad's pluggable storage drives. This provides the end user of a digital camera, PDA, or other wireless device, with a virtually inexhaustible amount of local storage.

Figure 6:
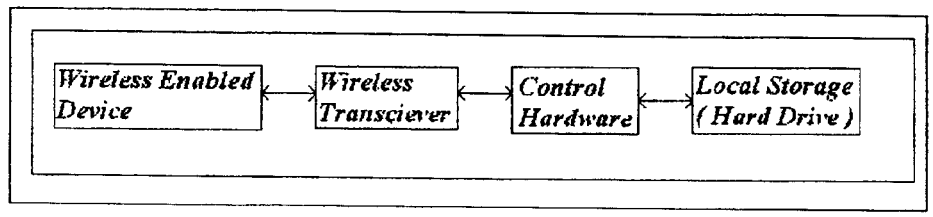
FIG. 6 shows a block diagram of our preferred wireless enabled mass storage device.

The use of an IBM Thinkpad as shown in the block diagram of FIG. 6 provides a wireless enabled mass storage device in the environment illustrated. The Thinkpad provides with its plug in floppy storage a local, portable storage device that is enabled with a wireless interface provided by the IBM Thinkpad illustrated by FIG. 2, having not only the Bluetooth, wireless LAN and infrared image reception capability, but also other reception capability provided by a receiver port providing serial, USB, and IDE communication ports. This makes it possible for users of wireless devices, who need larger storage capacities, to have a simple solution to their problem.

For example, a news agency photographer could use this device to make the digital camera he is using have an extremely large storage space. This would resolve issues of storing high resolution photographs in large quantities from a news briefing, where existing cameras would be limited by the amount of internal memory they contain.

Also, this device could be used to provide business users with a method of transporting large amounts of data from one location to another in a convenient fashion. Existing technologies are limited in capacity to several hundred megabytes of data, where this method of data transfer provides storage only limited by existing hard drive technologies.

In instances where single hard drives do not contain enough storage space for the desired application, multiple wireless enabled hard drives can be used jointly as illustrated by FIG. 2.

The preferred embodiment of this device is composed of a disk drive, such as the IBM Deskstar 75GXP 45 GB HDD, with a Bluetooth transmitter/receiver and a battery pack in the form of the IBM Thinkpad. Bluetooth has various packet types, and depending on the types the achievable throughput varies. For instance, a Bluetooth transmitter/receiver can have a won way rate of 721 Kbps, however, the reverse direction will be only 57.6 Kbps. Then 721 Kbps is achieved by using a 5 slot packet (DH5). As we mentioned, 1 MBS is the clock rate, so that limits the data rate, and furthermore, if there is more than one connection, the total maximum achievable throughput has to be shared among those active devices in the same cell.

Figure 7:
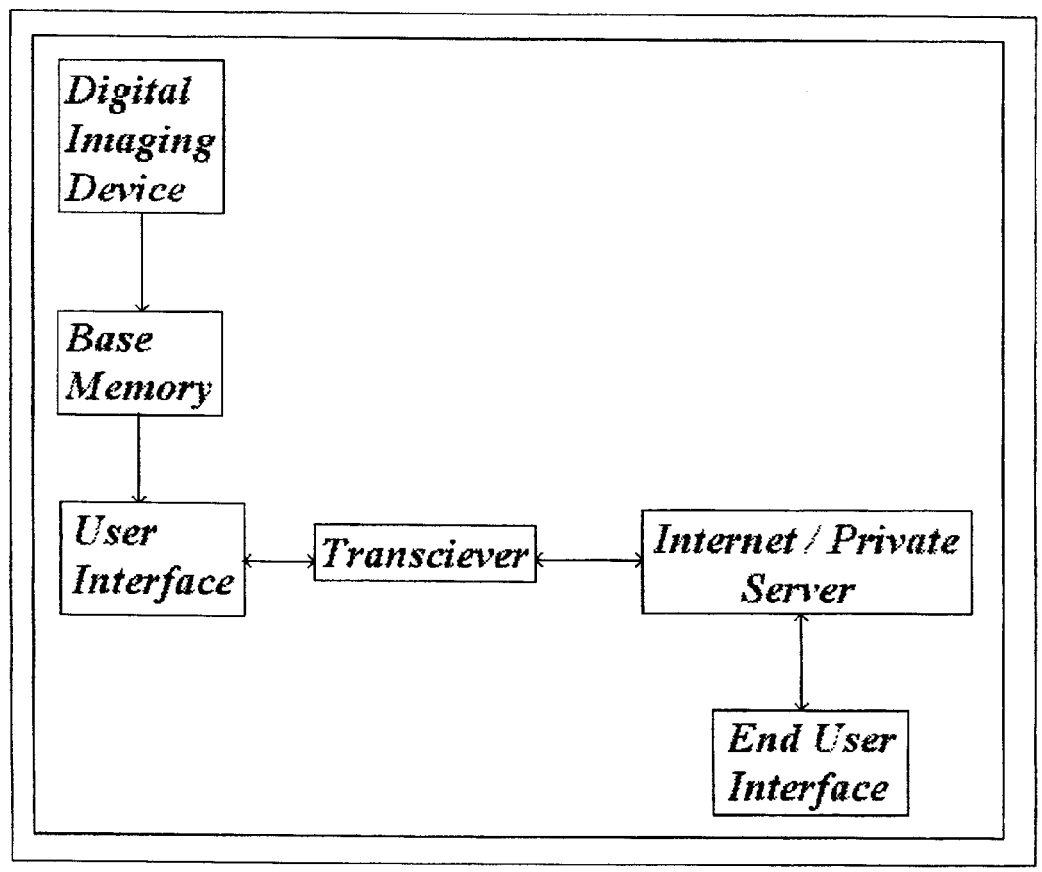
FIG. 7 shows our preferred embodiment for processing with a digital imaging device digital information via the Internet to an end user interface.

FIG. 7 shows our preferred embodiment for processing with a digital imaging device digital information via the Internet to an end user interface. FIG. 7 illustrates a system employing digital cameras that have a limited memory as are those currently available and though they don't require photo processing, once their internal memory is used up, or the available swappable memory is exhausted, the user is required to access a personal computer to free up the storage space in order to continue using the camera. The preferred embodiment illustrated by FIG. 7 employs a device having internal memory that would transfer the data up to the internet through a wireless transceiver.

In accordance with a preferred embodiment of the invention a digital camera is provided with an interface enabling a direct wireless uplink to the intranet/internet. As pictures are taken, they are transferred directly to a intranet/Internet/

Private server and from that server they are viewable on a private and/or public web page.

A Wireless Digital Camera as shown in FIG. 7 is preferably a Sony DSC-D770 provided with a wireless transceiver to allow direct communication with a remote server. Software running on the remote server detects and uploads data to the client's directory and makes the image accessible on the client's web page/s. In this embodiment, the private server may be one having the same feature as that of the first computer of FIG. 2, which is an IBM Thinkpad having both a wireless LAN access point and a Bluetooth access point and having an USB port for receiving wireless communications adaptable to that port.

In this embodiment, the user interface from the Digital Imaging Device, the Sony DSC-D770, uses Bluetooth wireless communication user interface to transmit the images to a local device functioning as the first computer and called the transceiver which is coupled to the Internet/Private Server. The first computer in the form of a local device (transceiver) may be a long distance transmitter such as a cell phone used to connect to a remote server, a local Bluetooth hub connected to a server or Bluetooth enabled local mass storage. These images are uploaded to the server via the intranet/internet and made directly available for viewing on public or private web pages by the service provider at the end user interface. In the case where Bluetooth enabled local mass storage is used for temporary storage, the images are not available on the internet until the storage device comes within range of a Bluetooth enabled transmitter.

The Bluetooth communication and wireless LAN interface with IR optical receiver capability represented by the User Interface may be replaced with other modes of wireless transmission, such as Digital PCS, Cellular Modem, Wireless LAN, and the other digital protocols mentioned, or their equivalents which can be received by the first computer of the system.

Once images are uploaded to the remote server they are made available on the web pages for the client through software. A program running on the server monitors changes in the clients upload directories. Once an upload is detected, the program regenerates the html for that clients web directory, providing a link to the new image. Information entered at the camera interface at the time the picture is taken may be used to direct the program as to where the image should appear in the clients web directory (marked by subject category, marked as private, marked as public, marked as send to e-mail distribution list X).

The types of user transceiver interfaces to be implemented for the wireless digital imaging user interface, include, as alternative embodiments, one or more of the following:

A PDA type interface for the digital camera would include an area which the user would write on to enter data. This special area of the camera would recognize the strokes entered by the user and would convert these strokes to typical alphanumeric ASCII characters. This writing area could be integrated by incorporation into the digital camera itself or it can be provided as a plugable unit. Appropriate data to be entered by the user could include information to appear in the caption of the image (e.g. "Photo of John and Sally taken at the corner of 42nd and 8th in New York City) or commands to be issued to the digital camera (e.g. "Send image to NYPD server at 555-1211). The aforementioned data would be entered using a stylus, pen, fingertip, or other similar device.

For voice recording the user would speak into the device to provide information about the picture being taken including, for instance the date, time, location, and subject, and that audio information would be recorded by the camera. The user then plays back the information at his/her convenience to write down or otherwise store the information recorded. If the digital images taken are to be burned to a CD, this recorded voice data is converted into a .wav or .mp3 file to be included on the CD. For instance, for a policemen taking pictures of a crime scene, the policemen may provide a brief description of the scene, and then he/she may proceed to take a number of pictures of the crime scene. When he/she later archives the data on a CD, his/her description of the scene can be placed at the beginning of the CD.

For direct voice conversion the user would speak into the device to issue commands or provide information similar to that described above. The device would then recognize the words and would either convert the spoken information into written information (e.g. a typed caption for the photo) or into a .wav or .mp3 file for later use.

With a telephone style keypad the user would type information into the device using the traditional ten-key keypad found on telephones. This keypad could be incorporated into the digital camera itself or it could be a plugable unit. The user can directly dial the ISP where he/she wishes to send the photos, or he/she can enter other data A wireless information station would be provided in keeping with the resort business model by resorts, amusement parks, etc. which would provide the "wireless information stations" at popular photo areas which provide the user with pertinent information. For example, at "Sleeping Beauty's Castle" in Walt Disney World's Magic Kingdom, tourists wishing to take a picture at that location would initiate the wireless connection with the local information station. When the connection is made to the local station, the information station would transmit information such as date, time, and location to be downloaded into the camera. The user would then close the connection and would shoot the picture. The information downloaded at the information station would be transmitted along with the digital image. These wireless information stations would appear in numerous locations throughout the resort or park, thereby allowing the user to have uniformly pre-formatted captions for all of his/her images.

Automatic data/time stamps are provided with this interface in order to require the least need of interaction on the part of the user. Each digital image is automatically stamped with the date and time the image is taken. The camera would include software which continually kept track of the date and time, so the user would never have to enter this information. Either one or both of the automatic date or time stamp functions could be turned on or off by the user.

Preprogrammed function buttons are provided for the digital camera which would include a number of buttons which can by employed by the user. While other buttons could be included by those skilled in the art, we prefer the following functions: "Display Date," "Display Time," "Place Caption at Top of Image," "Insert Border," "Transmit Image Immediately," "Transmit Image When Memory is 80% Full,".

The FIG. 8 below specifies an example of a data object generated in the camera and transferred to the server. Maximum size of this object as defined is approximately 196 Kbytes plus the image size, though the average object size will only be about 200 bytes plus the image data.

The User ID field illustrated in FIG. 8 contains a 16 Byte User ID and an 8 Byte Device ID. Bluetooth specifies a 48-bit device ID, so this format will allow Bluetooth device information to be relayed and associated with a User ID. This format will provide a means to associate devices with users, making it possible to detect invalid device transmissions. Each user account contains a directory where all of the image data is stored. Associated with this user account is an HTML interface. This interface provides a means to categorize images into separate HTML pages and sub pages. One page linked to the User root page contains a list of all files in the user directory, allowing easier account maintenance by the user.

The File Information field illustrated in FIG. 8 contains two fields. The first field indicates the number of bytes contained in the second field. The second field, containing up to 64 Kbytes, is used to specify file name. Standard extensions such as .gif .tif .jpg etc. May be used to specify the file type.

The Command field illustrated in FIG. 8 contains two fields. The first field indicates the number of bytes contained in the second field. The second field, containing up to 64 Kbytes, is used to send commands to the server. An example of such a command might be to create or destroy pages, or to delete images, change page links, and the like.

A 3 Byte Flag Field illustrated in FIG. 8 is not defined and may be used for future specifications.

The Image Data illustrated in FIG. 8 is separated into two fields. The first field is 4 bytes and specifies how many bytes are contained in the data field. The data field may contain up to 4 Gbytes of image data. This format may also be used for voice capture, file transfer, or any other application simply by using the image data field to transfer the desired information.

The Caption Information field illustrated in FIG. 8 is separated into three fields. The first field contains 2 Bytes and is used to specify how may bytes are contained in the third field. The second field contains a byte to specify the type of data contained in the caption. Although the default data type would be text, this field could be used to indicate the caption information is a voice dictation or other data type. The third field contains up to 64 Kbytes of caption information, and will be associated with the image data. This field contains information which will be displayed and linked with the image, and may contain information such as a text description and GPS data. Non-text data will be linked to the image for multi-media transmissions.

When the data object is received by the application software running on the server, the data fields are separated. The User ID field is used to determine which account the data object is to be processed for and if the data object is valid. The software then directs the output for the object processing to the specified user account directory.

Next the command field is processed. Images may be categorized by creating different HTML pages and sub pages that contain links to the various images or pages in the user's directory. The command field may be used to create new pages, link existing images to pages, link pages to pages, remove links from pages, delete pages, and any other account services standard account services. This field would be used to link the current image to an existing page if desired. This field may also be used to send e-mail containing any of the images in the user's account (or the image currently being transferred).

The image data is then saved to the users directory under the name specified by the File Information field. Finally, the caption Information is processed. This information is saved to the user directory in a file name that is identical to the name from the file specification with an extension appended to the end of it. The extension used depends on the flag field specified in the Caption Information. When a link command is executed that links in the image data, the associated caption file is also processed. If the caption is text, the contents of the file are copied to the HTML in the linking page. For all other data formats, a link associated with the link for the image file is added to the caption file in the linking page.

An additional option which may be utilized for the image data is for the application software to generate thumbnails of all of the image data when it is received. Linking operations to an image file containing an associated thumbnail will link to the thumbnail instead of the image file itself, and the thumbnail in turn will link to the actual image file as well as the non-text caption. This option makes viewing the pages of image data more manageable for the user.

Figure 9:
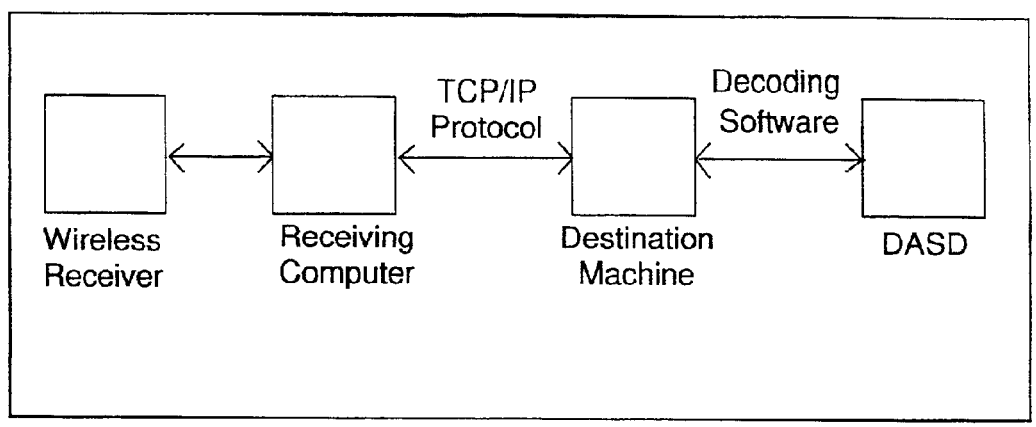
FIG. 9 illustrates the transfer of a data object from a camera to a remote server or destination mating having attached DASD using TCP/IP.

Transfer of the data object from the Camera to the remote server is illustrated by FIG. 9 showing the use of standard TCP/IP in connection with a destination machine having attached DASD, either directly or over a Storage Area Network.

The data object is received by the wireless receiver illustrated in FIG. 9 and is sent to the receiving computer's IP stack. This routes the data from the receiving computer to the destination machine using standard TCP/IP protocols. Once the data is received at the destination machine, the server software on the machine would process the data object (previously described).

The use of standard TCP/IP provides the user with a means to direct the data to a different server, such as a home PC, where the data object can be processed with the application software running on that machine.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for enabling at least one first user to provide in a web session one or more objects stored as recording image data taken with a digital camera in a computer system having a web control site server having multi-media storage capability;

a first computer device for use by a first user, the first computer having access for communication with said server via a wireless network;

a plurality of other servers having multi-media storage capability having access to said web control site server;

a second computer having access to said control site server via the web;

in which computer system said method comprises the steps of:

selecting at said second computer a web session enabling a plurality of pages to be accessed at a URL, providing a request to one of said other servers having said URL for a plurality of pages which a user desires to access, executing by said one other server routines allowing said user to select and view one or more pages for a web session prepared for a web session by accessing a file prepared for such purpose by a multi-media routine executed after said first computer is accessed by a first user, said first computer multi-media routine receiving from said first user digital image data at a receiver port of said first computer device from a transmitter attached to a digital image store and registered to said first user as a digital camera which is enabled to access said first computer device to cause execution of said multi-media routing to create in said computer system said file prepared for web session access after said first computer device is accessed by said first user.

2. A method according to claim 1 wherein said first computer is accessed by a transmitter transmitting multi-media data including digital image date via a wireless protocol handled by a multi-protocol wireless bridge provided in said first computer for receiving Bluetooth, Wireless LAN, and infrared image data.

3. A method according to claim 2 where said wireless protocol is interchangeable and handles a plurality of wireless transmission protocols, including a plurality of protocols of a Bluetooth, wireless LAN, infrared image data, digital wireless data via a digital wireless modem, satellite data via a satellite modem, RF transmission, and cellular transmission group of protocols.

4. A method according to claim 1 wherein said digital camera is a wireless digital camera having optical hardware for sampling images and storing them in a digital format.

5. A method according to claim 1 wherein said digital camera has storage for retaining digital images prior to transmission.

6. A method according to claim 1 wherein said digital camera image files are transferred to a supporting internet account of a registered first user and thereafter said files are directly viewable on private or public web pages.

7. A method according to claim 1 wherein said digital camera transfers images to said first computer image via an existing port, enabled for serial, USB, and IDE communication.

8. A method according to claim 1 wherein said first computer device is accessed from a portable digital image store having attached thereto a transceiver for transmitting multi-media data including digital image data via a wireless protocol.

* * * * *